US006942713B2

(12) United States Patent
Ogunwumi et al.

(10) Patent No.: US 6,942,713 B2
(45) Date of Patent: Sep. 13, 2005

(54) CERAMIC BODY BASED ON ALUMINUM TITANATE

(75) Inventors: Steven B. Ogunwumi, Painted Post, NY (US); Patrick D. Tepesch, Corning, NY (US); Raja R. Wusirika, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/955,364

(22) Filed: Sep. 30, 2004

(65) Prior Publication Data

US 2005/0091952 A1 May 5, 2005

Related U.S. Application Data

(60) Provisional application No. 60/517,348, filed on Nov. 4, 2003.

(51) Int. Cl.[7] .................................................. B01D 46/00

(52) U.S. Cl. .................. 55/523; 55/385.3; 55/DIG. 30; 501/5; 501/8; 501/80; 501/128; 501/134; 501/136; 501/137; 264/44; 264/628; 264/630; 264/638; 264/DIG. 48

(58) Field of Search ............................. 55/282.3, 385.3, 55/523, DIG. 10, DIG. 30; 501/5, 6, 8, 10, 80, 134, 136, 137, 143, 153, 154, 128; 264/44, 603, 628, 629, 630, 631, 638, DIG. 48

(56) References Cited

U.S. PATENT DOCUMENTS 2,776,896 A * 1/1957 Harman et al. ............. 501/134
3,316,965 A 5/1967 Watanbe et al.
4,118,240 A 10/1978 Takabatake
4,194,917 A 3/1980 Sakemi et al.
4,277,539 A 7/1981 Keller et al.
4,306,909 A 12/1981 Oda et al.
4,307,198 A 12/1981 Oda et al.
4,327,188 A * 4/1982 Endo et al. ................. 501/134
4,364,760 A * 12/1982 Higuchi et al. ............... 55/523
4,483,944 A * 11/1984 Day et al. ................... 501/128
4,598,054 A 7/1986 Mochida et al.
4,758,542 A 7/1988 Parker
4,767,731 A * 8/1988 Asami et al. ............... 501/134
4,855,265 A 8/1989 Day et al.
4,900,703 A * 2/1990 Ono et al. .................. 501/136
4,915,887 A 4/1990 Day et al.
4,985,815 A 1/1991 Endo
5,008,222 A 4/1991 Kameda
5,147,835 A * 9/1992 Franzak et al. ............. 501/134
5,153,153 A 10/1992 Freudenberg et al.
5,288,672 A 2/1994 Gugel et al.
5,290,739 A 3/1994 Hickman
5,346,870 A 9/1994 Noguchi et al.
5,422,324 A 6/1995 Noguchi et al.
5,676,833 A 10/1997 Odaka et al.
5,846,276 A 12/1998 Nagai et al.
6,101,793 A 8/2000 Nagai et al.
6,197,248 B1 3/2001 Fukuda et al.
6,210,645 B1 * 4/2001 Kumazawa et al. ........ 501/134
6,620,751 B1 9/2003 Ogunwumi
2003/0015829 A1 1/2003 Fukuda et al.
2004/0092381 A1 * 5/2004 Beall et al. ................. 501/134

FOREIGN PATENT DOCUMENTS

WO 2004/011124 2/2004

* cited by examiner

*Primary Examiner*—Duane Smith
*Assistant Examiner*—Jason M. Greene
(74) *Attorney, Agent, or Firm*—Anca C. Gheorghiu

(57) ABSTRACT

An aluminum titanate-based ceramic body having a composition a formula comprising $a(Al_2O_3.TiO_2)+b(CaO.Al_2O_3.2SiO_2)+c(SrO.Al_2O_3.2SiO_2)+d(BaO.Al_2O_3.2SiO_2)+e(3Al_2O_3.2SiO_2)+f(Al_2O_3)+g(SiO_2)+h(Fe_2O_3.TiO_2)+i(MgO.2TiO_2)$, wherein a, b, c, d, e, f, g, h, and i are weight fractions of each component such that $(a+b+c+d+e+f+g+h+i)=1$, wherein $0.5<a\leqq 0.95$; $0\leqq b\leqq 0.5$; $0\leqq c\leqq 0.5$; $0\leqq d\leqq 0.5$; $0<e\leqq 0.5$; $0\leqq f\leqq 0.5$; $0\leqq g\leqq 0.1$; $0\leqq h\leqq 0.3$; $0\leqq i\leqq 0.3$; $b+d>0.01$. A method of forming the ceramic body is provided. The ceramic body is useful in automotive emissions control systems, such as diesel exhaust filtration.

14 Claims, 3 Drawing Sheets

CERAMIC BODY BASED ON ALUMINUM TITANATE

This application claims the benefit of U.S. Provisional Application No. 60/517,348 filed Nov. 4, 2003, entitled "Ceramic Based on Aluminum Titanate", by Steven B. Ogunwumi, et al.

BACKGROUND OF THE INVENTION

The instant invention relates to ceramic bodies based on aluminum titanate having low thermal expansion, high porosity, and high strength for use in high temperature applications.

Cordierite ceramic bodies, especially such formed as honeycomb multicellular structures, find employment in a number of high temperature applications such as catalytic converters, NOx adsorbers, electrically heated catalysts, molten metal filters, regenerator cores, chemical process substrates, catalysts for hydrodesulfurization, hydrocracking, or hydrotreating, and filters such as diesel particular filters.

In diesel exhaust filtration, cordierite, being a low-cost material, in combination with offering low CTE, has been the material of choice. Porous cordierite ceramic filters of the wall-flow type have been utilized for the removal of particles in the exhaust stream from some diesel engines since the early 1980s. A diesel particulate filter (DPF) ideally combines low CTE (for thermal shock resistance), low pressure drop (for engine efficiency), high filtration efficiency (for removal of most particles from the exhaust stream), high strength (to survive handling, canning, and vibration in use), and low cost. Problems with cordierite include low volumetric heat capacity and low thermal conductivity which can result in unacceptably high temperatures during operation when the filters are regenerated under certain conditions, as well as low thermal durability. Further, inorganic particulates, known as ash, present in the diesel exhaust can react with cordierite and cause filter failures.

An alternative material to cordierite for DPF manufacturing is SiC. Although this material exhibits both high volumetric heat capacity and high thermal conductivity, it also has poor thermal shock resistance as a result of relatively high thermal expansion and high elastic modulus. The poor thermal shock resistance requires SiC filters to be segmented to prevent thermal shock failure during use. Also, processing requirements (i.e., high temperatures, inert atmospheres, and segmentation) result in high manufacturing costs.

There is a need to provide alternative low CTE materials that are useful in high temperature applications, such as automotive emissions control systems. It would be desirable to provide materials that have a low CTE and excellent thermal shock resistance. The present invention provides such a ceramic material, and a method of making and using the same.

SUMMARY OF THE INVENTION

The instant invention is founded upon the discovery of aluminum titanate-based ceramic bodies of low expansion that exhibit properties suitable for high temperature applications, such as automotive emissions control, including but not limited to automotive catalytic converters, and diesel exhaust aftertreatment systems, such as diesel particulate filters.

There is provided herein a ceramic body having a composition comprising: $a(Al_2O_3.TiO_2)+b(CaO.Al_2O_3.2SiO_2)+c(SrO.Al_2O_3.2SiO_2)+d(BaO.Al_2O_3.2SiO_2)+e(3Al_2O_3.2SiO_2)+f(Al_2O_3)+g(SiO_2)+h(Fe_2O_3.TiO_2)+i(MgO.2TiO_2)$ where a, b, c, d, e, f, g, h, and i are weight fractions of each component such that $(a+b+c+d+e+f+g+h+i)=1$, and the following conditions are met $0.5<a\leqq 0.95$; $0\leqq b\leqq 0.5$; $0\leqq c\leqq 0.5$; $0\leqq d\leqq 0.5$; $0<e\leqq 0.5$; $0\leqq f\leqq 0.5$; $0\leqq g\leqq 0.1$; $0\leqq h\leqq 0.3$; $0\leqq i\leqq 0.3$; $b+d>0.01$.

A method of making the inventive ceramic bodies comprises: (a) formulating a batch of inorganic raw materials comprising sources of silica, alumina, strontium, titania, barium, calcium and/or iron oxide together with organic processing comprising plasticizers, lubricants, binders, and water as solvent, and mixing to form a homogeneous and plasticized mixture; (b) shaping the plasticized mixture into a green body; (c) heating the green body to a temperature and for a time to obtain the above described aluminum titanate-based ceramic. This heating is preferably done to a top temperature of between 1350°–1600° C., with a hold of 4–8 hours.

In one embodiment there is provided a ceramic filter, such as a diesel particulate filter comprising a plugged, wall-flow honeycomb filter body composed of the inventive ceramic body. A successful application of diesel exhaust filters requires low pressure drops and high durability during thermal cycling. The diesel particulate filter is comprised of a plugged, wall-flow honeycomb body having an inlet end and an outlet end and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

In another embodiment a diesel particulate filter comprises an end-plugged, wall-flow honeycomb filter body composed of the inventive ceramic body with a composition comprising: $a(Al_2O_3.TiO_2)+b(CaO.Al_2O_3.2SiO_2)+c(SrO.Al_2O_3.2SiO_2)+d(BaO.Al_2O_3.2SiO_2)+e(3Al_2O_3.2SiO_2)+f(Al_2O_3)+g(SiO_2)+h(Fe_2O_3.TiO_2)+i(MgO.2TiO_2)$ where a, b, c, d, e, f, g, h, and i are weight fractions of each component such that $(a+b+c+d+e+f+g+h+i)=1$, where a=0.7, b=0.04, c=0.185, e=0.075, d, f, g, h, i=0.

In another embodiment a diesel particulate filter according to the present invention exhibits the following properties: a CTE (RT to 1000° C.) of less than $10\times 10^{-7}$/° C.; a porosity of 40% to 55% by volume; a median pore size of 5 to 20 micrometers, preferably 10 to 15 micrometers; and, a modulus of rupture, as measured by the four-point method on a cellular bar cut parallel to the direction of the channels from a honeycomb body having a cell density of 200 cells per square inch (cpsi) and 0.016 inch thick walls, of 150 to 400 psi, preferably 150 to 300 psi; and, a pressure drop of 5 kPa or less at an artificial carbon soot loading of up to 5 g/L at a flow rate of 210 scfm for a cell density of 273 cpsi, and a cell wall thickness of 0.013 inch in a 5.51"x5.9041 sample.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE INVENTION

Figure 1:
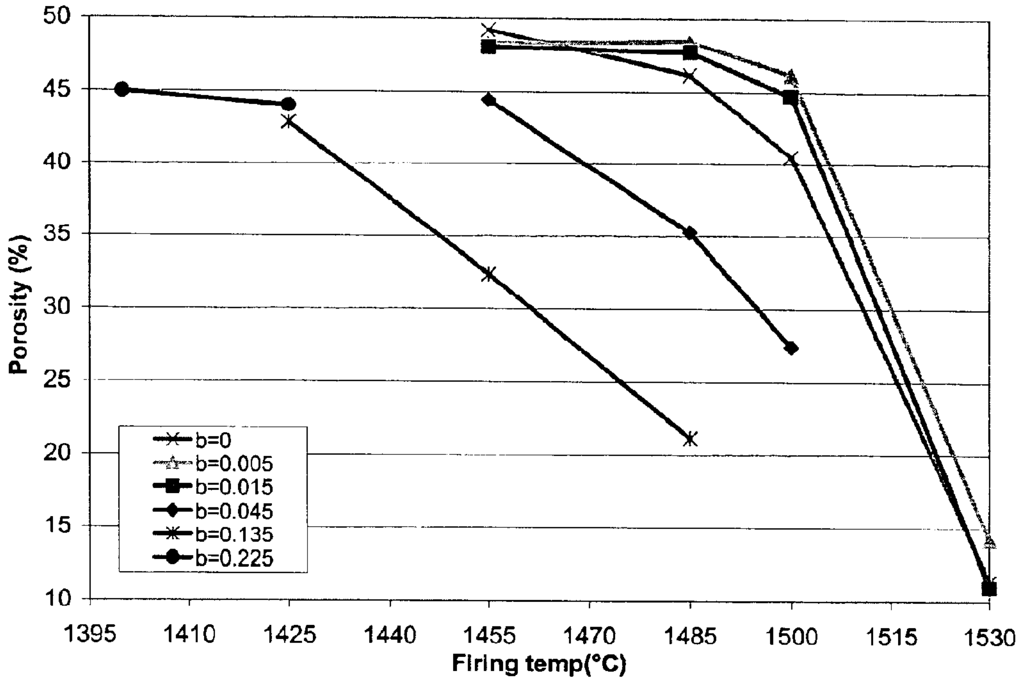
FIG. 1 is a graphical representation of porosity as a function of maximum soak temperature (8 hours) for inventive compositions with a=0.6965, e=0.075, h=0.0035, and c=1−b, where b is between 0–0.225, and d, f, g, i all equal 0.

The invention provides an aluminum titanate-based ceramic body having a composition comprising: $a(Al_2O_3.TiO_2)+b(CaO.Al_2O_3.2SiO_2)+c(SrO.Al_2O_3.2SiO_2)+d(BaO.Al_2O_3.2SiO_2)+e(3Al_2O_3.2SiO_2)+f(Al_2O_3)+g(SiO_2)+h(Fe_2O_3.TiO_2)+i(MgO.2TiO_2)$ where a, b, c, d, e, f, g, h, and i are weight fractions of each component such that (a+b+c+d+e+f+g+h+i)=1, and the following conditions are met: $0.5<a\leqq 0.95$; $0\leqq b\leqq 0.5$; $0\leqq c\leqq 0.5$; $0\leqq d\leqq 0.5$; $0<e\leqq 0.5$; $0\leqq f\leqq 0.5$; $0\leqq g\leqq 0.1$; $0\leqq h\leqq 0.3$; $0\leqq i\leqq 0.3$; b+d>0.01.

The inventive structures exhibit a low coefficient of thermal expansion (CTE) from a microcracks, good thermal shock resistance and good thermal durability. Accordingly, the inventive ceramic body is useful for diesel exhaust filtration. In particular, the inventive structures are suitable for as wall-flow diesel particulate filters.

In an embodiment a diesel particulate filter comprises an end-plugged, wall-flow honeycomb ceramic body with a composition comprising: $a(Al_2O_3.TiO_2)+b(CaO.Al_2O_3.2SiO_2)+c(SrO.Al_2O_3.2SiO_2)+d(BaO.Al_2O_3.2SiO_2)+e(3Al_2O_3.2SiO_2)+f(Al_2O_3)+g(SiO_2)+h(Fe_2O_3.TiO_2)+i\ (MgO\text{-}2TiO_2)$ where a, b, c, d, e, f, g, h, and i are weight fractions of each component such that (a+b+c+d+e+f+g+h+i)=1, where a=0.7, b=0.04, c=0.185, e=0.075, d, f, g, h, i=0.

The honeycomb filter body has an inlet end and an outlet end and a multiplicity of cells extending from the inlet end to the outlet end, the cells having porous walls. Part of the total number of cells at the inlet end are plugged along a portion of their lengths, and the remaining part of cells that are open at the inlet end are plugged at the outlet end along a portion of their lengths. This plugging configuration allows for engine exhaust stream passing through the cells of the honeycomb from the inlet end to the outlet end to flow into the open cells, through the cell walls, and out of the structure through the open cells at the outlet end. Suitable cellular densities for diesel particulate filters range from 70 cells/in$^2$ (10.9 cells/cm$^2$) to 800 cells/in$^2$ (124 cells/cm$^2$).

In another embodiment, a diesel particulate filter according to the present invention exhibits a CTE (RT to 1000° C.) of less than $10\times10^{-7}$/° C.; a porosity of 40% to 55% by volume; a median pore size of 5 to 20 micrometers, preferably 10 to 15 micrometers; a modulus of rupture, as measured by the four-point method on a cellular bar cut parallel to the direction of the channels from a honeycomb body having a cell density of 200 cells per square inch (cpsi) and 0.016 inch thick walls, of 150 to 400 psi, preferably 150 to 300 psi; and, a pressure drop of 5 kPa or less at an artificial carbon soot loading of up to 5 g/L at a flow rate of 210 scfm for a cell density of 273 cpsi, and a cell wall thickness of 0.013 inch in a 5.51"×5.90" sample.

The invention also relates to a method of fabricating the inventive aluminum titanate-based ceramic for forming a mixture from certain inorganic powdered raw materials which include sources of silica, alumina, strontium, titania, calcium, barium and/or iron oxide. The raw materials are blended with together with organic processing aids that may include plasticizers, lubricants, binder, and water as solvent. The mixture is then shaped into a green body, optionally dried, and fired to form the product structure. A pore former, such as graphite or polyethylene beads, may be optionally used to improve the porosity and median pore size. A pore former is a fugitive particulate material which evaporates or undergoes vaporization by combustion during drying or heating of the green body to obtain a desired, usually higher porosity and/or coarser median pore diameter. Large particle sizes in the raw materials are not preferred.

An alumina source is a powder which when heated to a sufficiently high temperature in the absence of other raw materials, yield substantially pure aluminum oxide, and includes alpha-alumina, a transition alumina such as gamma-alumina or rho-alumina, hydrated alumina, gibbsite, boehmite, aluminum hydroxide, and mixtures thereof. The particle size of the alumina source is up to 25 micrometers. A silica source includes cristobalite, non-crystalline silica such as fused silica or sol-gel silica, silicone resin, zeolite, and diatomaceous silica, kaolin, and quartz. The median particle size of the silica source is up to 30 micrometers.

A titania source is preferably, but not limited to, rutile. The median particle size of the titania source is important to avoid entrapment of unreacted oxide by the rapidly growing nuclei in the structure. Accordingly, the median particle size is up to 20 micrometers. A strontium source is strontium carbonate, with a median particle size of up to 20 micrometers. A barium source is barium carbonate or barium sulfate, with a median particle size of up to 20 micrometers. A calcium source is calcium carbonate, with a median particle size of up to 20 micrometers. Iron oxide source has a median particle size of up to 0.5 micrometers.

It may be necessary to include a pore former with the raw materials to tailor the porosity and median pore size for diesel particulate filter applications. Graphite or polyethylene beads are suitable for this purpose. The pore former is a fugitive material that evaporates or undergoes vaporization by combustion during drying or heating of the green body to usually obtain higher porosity and/or coarser median pore diameter. Typically the pore former may be added at between 20–40% by weight per 100% by weight of inorganic raw materials.

The inorganic powdered raw materials are mixed with organic processing components, such as methylcellulose binder, oleic acid/triethanol amine surfactant, to form a plasticized and homogeneous mixture. The plasticized mixture is shaped by any conventional means, preferably by extrusion through a honeycomb die. The resulting green bodies are optionally dried, and then heated over various temperature intervals with hold temperature and times between 1350°–1600° C., with holds of 6–8 hours at top temperature to develop the final product structure.

To obtain a wall-flow filter, a portion of the cells of the honeycomb structure at the inlet end or face are plugged, as known in the art. The plugging is only at the ends of the cells which is typically to a depth of about 1 to 20 mm, although this can vary. A portion of the cells on the outlet end but not corresponding to those on the inlet end are plugged.-

Therefore, each cell is plugged only at one end. The preferred arrangement is to have every other cell on a given face plugged in a checkered pattern.

To more fully illustrate the invention, the following non-limiting examples are presented. All parts, portions and percentages are on a weight basis unless otherwise stated.

EXAMPLES

Experimental samples are prepared by weighing out the dry ingredients, mixing them with organic components and water, and kneading the mixture in a stainless steel muller to form a plastic mass. Tables 1–4 provides parts and proportions for the batch materials, together with the weight fractions for the compositional components of the inventive formula.

In the preparation of the samples, triethanolamine (TEA) is first mixed with water, and then with oleic acid and/or tall oil (dispersant). The resulting solution is stored at room temperature for 24 hours and then refrigerated overnight prior to use. The dry ingredients which include silica, titania, strontium carbonate, barium carbonate, calcium carbonated, iron oxide, alumina, alumina hydroxide, silicone resin, graphite, polyethylene beads and/or methyl cellulose binder are dry mixed in a muller. The tall oil/TEA/water solution is slowly added during continuous mixing to provide homogenization and plasticization.

The plasticized mixture is extruded through a die into honeycomb bodies having approximately 200 cpsi and a wall thickness of about 0.016 inch. The bodies thus formed are cut to desired lengths, and heated in an oven at 85° C. until dry. The samples are fired in an electric furnace over various temperature intervals ranging from 1350–1500° C. with a hold time of 6–8 hours at top temperature to develop the final product structure, and cooled by shutting off power to the furnace. Example 17 is fired at both 1375° C. and 1425° C. Example 18 is fired over a temperature range of 1375° C. to 1455° C. Example 19 is fired at a first temperature of 1475° C. for 1 hour followed by firing at 1450° C. for 15 hours.

The samples are tested for properties as provided in Tables 5–10. These include modulus of rupture in pounds per square inch (psi) (as measured on a cellular bar cut parallel to the direction of the channels from a honeycomb body having a cell density of 200 cpsi and 0.016 inch thick walls, unless otherwise stated) porosity in % volume, median pore size in micrometers, thermal expansion $10^{-7}$/° C., and maximum dimensional difference (max dL) in % change.

Examples 1–5 have c=0 (no $SrO.Al_2O_3.2SiO_2$), and either b=0 (pure $BaO.Al_2O_3.2SiO_2$) or d=0 (pure $CaO.Al_2O_3.2SiO_2$). Table 5 shows the properties for these examples for particular firing schedules. Very low thermal expansion, and low thermal expansion hysteresis along with high porosity and high mean pore size for obtained in examples 2 and 5. If lower firing temperature is desired, examples 3–5 (d=0) are better. For applications which require more refractory materials examples 1–2 (b=0) are better. The porosity can be tailored by altering the batch composition and/or raw materials.

Examples 5–10 have a=0.6965 ($Al_2O_3.TiO_2$), d=0 (no $BaO.Al_2O_3.2SiO_2$), e=0.075, h=0.0035, the remainder being varying levels of b($CaO.Al_2O_3.2SiO_2$) and c ($SrO.Al_2O_3.2SiO_2$). Properties for examples 5–10 for selected firing schedules are presented in Table 6. In the inventive samples firing temperature can be controlled by controlling the b/c ratio in the batch without dramatic changes in thermal expansion or porosity.

Figure 2:
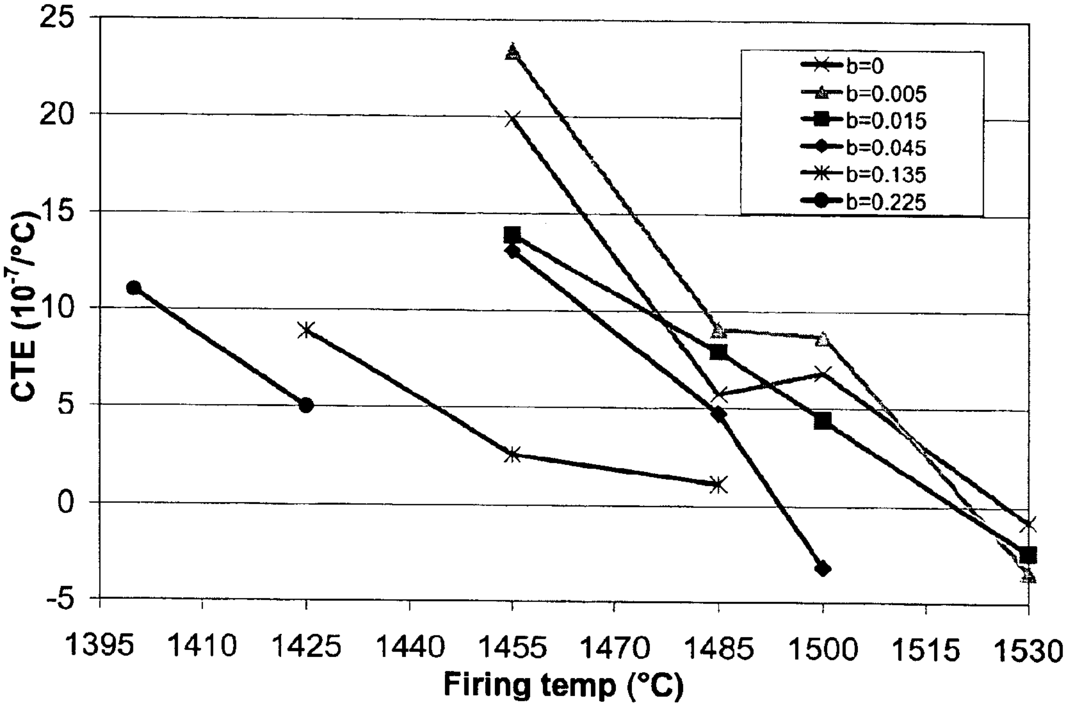
FIG. 2 is a graphical representation of thermal expansion as a function of maximum soak temperature (8 hours) for inventive compositions with a=0.6965, e=0.075, h=0.0035, and c=1−b, where b is between 0–0.225, and d, f, g, i all equal 0; and, FIG. 3 is a graphical representation of pressure drop difference between the inlet end and outlet end (kPa), as a function of soot loading (g/L) at a gas flow rate of 210 scfm, for a diesel particulate filter having a composition as provided in Example 19 of Table 7.

FIGS. 1 and 2 show the variation of porosity and thermal expansion with firing temperature (varying between 1395–1530° C.) for examples 5–10. Small substitutions of b for c (examples 6 and 7, where b=0.005 and 0.015 compared to example 10, with b=0) seem to lead to increased porosity at higher firing temperatures. Intermediate levels of substitution of b for c (examples 8 and 9, where b=0.045 and 0.135) lead to more gradual variation of porosity and thermal expansion with firing temperature.

Examples 11–14 have b=0 with two c/d ratios each with two levels of h. Table 7 shows properties of examples 11–14 fired at 1485° C. for 8 hours. All four examples have thermal expansion values below $10\times10^{-7}$/° C. and 45% or higher porosity. These examples show that increasing d($BaO.Al_2O_3.2SiO_2$) relative to c($SrO.Al_2O_3.2SiO_2$) slightly decreases both the thermal expansion and the porosity for the same firing schedule.

Examples 15–17 have c=0 with three b/d ratios. These examples exhibit negative thermal expansion values, but also lower porosities, as shown in Table 8. Example 17 shows that a mixture of b and d components allows firing at a lower temperature to obtain low CTE. Example 18 has b=c=d=0.075. Properties for this sample are shown in Table 9 as a function of temperature. Example 18 shows that the properties of the inventive ceramic can be tailored as a function of temperature.

Figure 3:
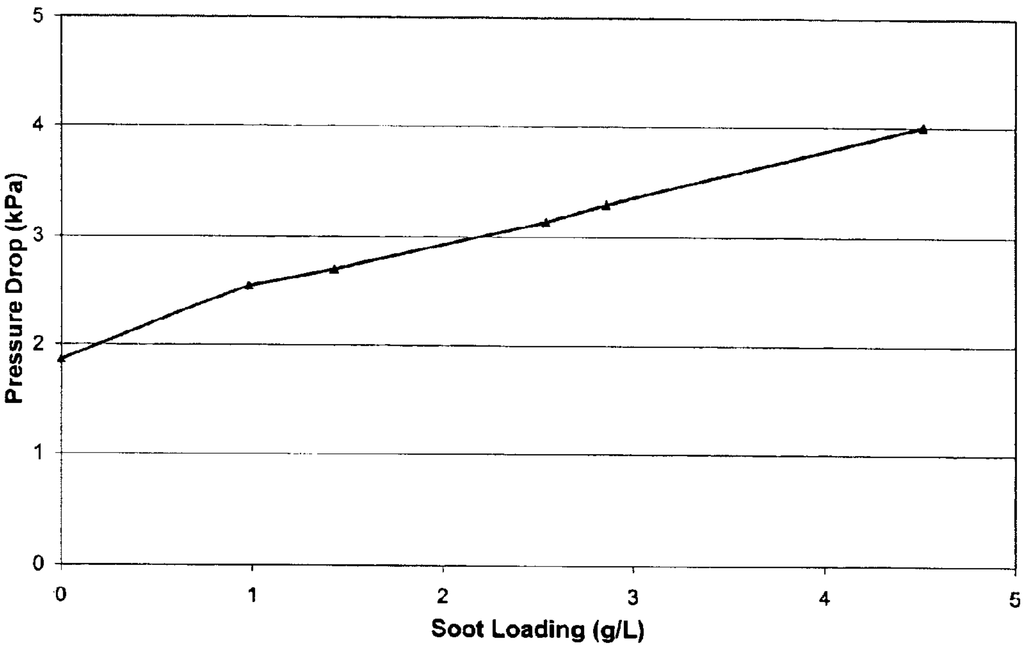

A preferred composition is provided for Example 19. Properties for Example 19 are shown in Table 10. This composition is especially suitable for the manufacture of diesel particulate filters comprising a plugged, wall-flow honeycomb body. Accordingly, an extruded honeycomb body is end-plugged at the inlet and outlet ends with a cold-set paste made of aluminum titanate powder. Dimensions of the sample include a diameter of 5.51 in., and a length of 5.90 in., a cell geometry of 292 cpsi and a cell wall thickness of 0.013 in. The pressure drop is tested by loading the sample with artificial soot (similar to copier toner) at a flow rate of 210 scfm, for loadings ranging up to 5 g/L, and measuring the pressure drop between the inlet end and the outlet end in kPa. The resulting data is graphically provided in FIG. 3 which shows excellent pressure drops of between 1.8 kPa and 4 kPa.

It should be understood that while the present invention has been described in detail with respect to certain illustrative and specific embodiments thereof, it should not be considered limited to such but may be used in other ways without departing from the spirit of the invention and the scope of the appended claims.

TABLE 1

| Composition and batch components for examples 1–6. | | | | | | |
|---|---|---|---|---|---|---|
| | Examples | | | | | |
| | 1 | 2 | 3 | 4 | 5 | 6 |
| Composition | | | | | | |
| a ($Al_2O_3.TiO_2$) | 0.7760 | 0.7000 | 0.7760 | 0.7760 | 0.6965 | 0.6965 |
| b ($CaO.Al_2O_3.2SiO_2$) | 0.0000 | 0.0000 | 0.2000 | 0.1000 | 0.2250 | 0.0000 |
| c ($SrO.Al_2O_3.2SiO_2$) | 0.0000 | 0.0000 | 0.0000 | 0.0000 | 0.0000 | 0.2250 |
| d ($BaO.Al_2O_3.2SiO_2$) | 0.1000 | 0.2250 | 0.0000 | 0.0000 | 0.0000 | 0.0000 |
| e ($3Al_2O_3.2SiO_2$) | 0.1000 | 0.0750 | 0.0000 | 0.1000 | 0.0750 | 0.0750 |
| f ($Al_2O_3$) | 0.0000 | 0.0000 | 0.0000 | 0.0000 | 0.0000 | 0.0000 |
| g ($SiO_2$) | 0.0000 | 0.0000 | 0.0000 | 0.0000 | 0.0000 | 0.0000 |
| h ($Fe_2O_3.TiO_2$) | 0.0240 | 0.0000 | 0.0240 | 0.0240 | 0.0035 | 0.0035 |
| i ($MgO.2TiO_2$) | 0.0000 | 0.0000 | 0.0000 | 0.0000 | 0.0000 | 0.0000 |
| Inorganic Batch Materials (wt. %) | | | | | | |
| $Fe_2O_3$ Hematite (Fisher Scientific) | 1.9 | 0.0 | 1.7 | 1.9 | 0.2 | 0.2 |
| $SiO_2$ Silverbond200 ® (Unimin Corp.) | 9.1 | 9.0 | 12.6 | 11.4 | 11.4 | 10.1 |
| $TiO_2$ 3020 ® (Kronos) | 29.7 | 29.6 | 29.0 | 29.4 | 29.7 | 29.8 |
| $Al_2O_3$ RMA-35 ® (Alcan) | 47.8 | 46.4 | 46.5 | 49.4 | 50.9 | 50.0 |
| Boehmite (gibsite) | 0.0 | 3.7 | 0.0 | 0.0 | 0.0 | 0.0 |
| $BaCO_3$ (Fisher) | 11.5 | 11.4 | 0.0 | 0.0 | 0.0 | 0.0 |
| $CaCO_3$ (Fisher) | 0.0 | 0.0 | 10.3 | 7.8 | 0.0 | 0.0 |
| $CaCO_3$ (EM Corp) | 0.0 | 0.0 | 0.0 | 0.0 | 0.0 | 0.0 |
| $CaCO_3$ (Mallinckrodt) | 0.0 | 0.0 | 0.0 | 0.0 | 7.8 | 0.0 |
| $SrCO_3$ (Chemical Products) | 0.0 | 0.0 | 0.0 | 0.0 | 0.0 | 9.9 |
| Organic Batch Additives (wt. %) | | | | | | |
| A4M Methocel | 6.4 | 4.5 | 6.4 | 6.4 | 6 | 6 |
| Oleic acid | 0.7 | 1 | 0.7 | 0.7 | 2 | 2 |
| TEA (Tri-ethanol amine) | | 0.15 | | | | |

TABLE 2

| Composition and batch components for examples 7–14. | | | | | | | | |
|---|---|---|---|---|---|---|---|---|
| | Examples | | | | | | | |
| | 7 | 8 | 9 | 10 | 11 | 12 | 13 | 14 |
| Composition | | | | | | | | |
| a ($Al_2O_3.TiO_2$) | 0.6965 | 0.6965 | 0.6965 | 0.6965 | 0.7000 | 0.6965 | 0.6965 | 0.7000 |
| b ($CaO.Al_2O_3.2SiO_2$) | 0.0050 | 0.0150 | 0.0450 | 0.1350 | 0.0000 | 0.0000 | 0.0000 | 0.0000 |
| c ($SrO.Al_2O_3.2SiO_2$) | 0.2200 | 0.2100 | 0.1800 | 0.0900 | 0.1850 | 0.1850 | 0.1450 | 0.1450 |
| d ($BaO.Al_2O_3.2SiO_2$) | 0.0000 | 0.0000 | 0.0000 | 0.0000 | 0.0400 | 0.0400 | 0.0800 | 0.0800 |
| e ($3Al_2O_3.2SiO_2$) | 0.0750 | 0.0750 | 0.0750 | 0.0750 | 0.0750 | 0.0750 | 0.0750 | 0.0750 |
| f ($Al_2O_3$) | 0.0000 | 0.0000 | 0.0000 | 0.0000 | 0.0000 | 0.0000 | 0.0000 | 0.0000 |
| g ($SiO_2$) | 0.0000 | 0.0000 | 0.0000 | 0.0000 | 0.0000 | 0.0000 | 0.0000 | 0.0000 |
| h ($Fe_2O_3.TiO_2$) | 0.0035 | 0.0035 | 0.0035 | 0.0035 | 0.0000 | 0.0035 | 0.0035 | 0.0000 |
| i ($MgO.2TiO_2$) | 0.0000 | 0.0000 | 0.0000 | 0.0000 | 0.0000 | 0.0000 | 0.0000 | 0.0000 |
| Inorganic Batch Materials (wt. %) | | | | | | | | |
| $Fe_2O_3$ Hematite (Fisher Scientific) | 0.2 | 0.2 | 0.2 | 0.2 | 0.0 | 0.2 | 0.2 | 0.0 |
| $SiO_2$ Silverbond200 ® (Unimin Corp.) | 10.1 | 10.2 | 10.4 | 10.9 | 9.8 | 9.8 | 9.6 | 9.6 |
| $TiO_2$ 3020 ® (Kronos) | 29.8 | 29.8 | 29.8 | 29.7 | 29.5 | 29.5 | 29.5 | 29.5 |
| $Al_2O_3$ RMA-35 ® (Alcan) | 50.0 | 50.0 | 50.1 | 50.5 | 46.9 | 46.8 | 46.7 | 46.8 |
| Boehmite (gibsite) | 0.0 | 0.0 | 0.0 | 0.0 | 3.7 | 3.7 | 3.7 | 3.7 |
| $BaCO_3$ (Fisher) | 0.0 | 0.0 | 0.0 | 0.0 | 2.0 | 2.0 | 4.0 | 4.0 |
| $CaCO_3$ (Fisher) | 0.0 | 0.0 | 0.0 | 0.0 | 0.0 | 0.0 | 0.0 | 0.0 |
| $CaCO_3$ (EM Corp) | 0.0 | 0.0 | 0.0 | 0.0 | 0.0 | 0.0 | 0.0 | 0.0 |
| $CaCO_3$ (Mallinckrodt) | 0.2 | 0.5 | 1.6 | 4.7 | 0.0 | 0.0 | 0.0 | 0.0 |
| $SrCO_3$ (Chemical Products) | 9.7 | 9.2 | 7.9 | 3.9 | 8.0 | 8.0 | 6.3 | 6.3 |

TABLE 2-continued

Composition and batch components for examples 7–14.

| | Examples | | | | | | | |
|---|---|---|---|---|---|---|---|---|
| | 7 | 8 | 9 | 10 | 11 | 12 | 13 | 14 |
| **Organic Batch Additives (wt. %)** | | | | | | | | |
| A4M Methocel | 6 | 6 | 6 | 6 | 4.5 | 4.5 | 4.5 | 4.5 |
| Oleic acid | 2 | 2 | 2 | 2 | 1 | 1 | 1 | 1 |
| TEA (Tri-ethanol amine) | | | | | 0.15 | 0.15 | 0.15 | 0.15 |

TABLE 3

Composition and batch components for examples 15–18.

| | Examples | | | |
|---|---|---|---|---|
| | 15 | 16 | 17 | 18 |
| **Composition** | | | | |
| a ($Al_2O_3.TiO_2$) | 0.7000 | 0.7000 | 0.7000 | 0.7000 |
| b ($CaO.Al_2O_3.2SiO_2$) | 0.0400 | 0.1850 | 0.1125 | 0.0750 |
| c ($SrO.Al_2O_3.2SiO_2$) | 0.0000 | 0.0000 | 0.0000 | 0.0750 |
| d ($BaO.Al_2O_3.2SiO_2$) | 0.1850 | 0.0400 | 0.1125 | 0.0750 |
| e ($3Al_2O_3.2SiO_2$) | 0.0750 | 0.0750 | 0.0750 | 0.0750 |
| f ($Al_2O_3$) | 0.0000 | 0.0000 | 0.0000 | 0.0000 |
| g ($SiO_2$) | 0.0000 | 0.0000 | 0.0000 | 0.0000 |
| h ($Fe_2O_3.TiO_2$) | 0.0000 | 0.0000 | 0.0000 | 0.0000 |
| i ($MgO.2TiO_2$) | 0.0000 | 0.0000 | 0.0000 | 0.0000 |
| **Inorganic Batch Materials (wt. %)** | | | | |
| $Fe_2O_3$ Hematite (Fisher Scientific) | 0.0 | 0.0 | 0.0 | 0.0 |
| $SiO_2$ Silverbond200 ® (Unimin Corp.) | 9.4 | 10.9 | 10.1 | 10.0 |
| $TiO_2$ 3020 ® (Kronos) | 29.7 | 29.4 | 29.5 | 29.6 |
| $Al_2O_3$ RMA-35 ® (Alcan) | 46.3 | 47.6 | 47.2 | 47.1 |
| Boehmite (gibsite) | 3.8 | 3.8 | 3.7 | 3.7 |
| $BaCO_3$ (Fisher) | 9.4 | 2.0 | 5.7 | 4.0 |
| $CaCO_3$ (Fisher) | 0.0 | 0.0 | 0.0 | 0.0 |
| $CaCO_3$ (EM Corp) | 1.4 | 6.4 | 3.9 | 2.3 |
| $CaCO_3$ (Mallinckrodt) | 0.0 | 0.0 | 0.0 | 0.0 |
| $SrCO_3$ (Chemical Products) | 0.0 | 0.0 | 0.0 | 3.3 |
| **Organic Batch Additives (wt. %)** | | | | |
| A4M Methocel | 4.5 | 4.5 | 4.5 | 4.5 |
| Oleic acid | 1 | 1 | 1 | 1 |
| TEA (Tri-ethanol amine) | 0.15 | 0.15 | 0.15 | 0.15 |

TABLE 4

Composition and batch components for example 19.

| | Example 19 |
|---|---|
| **Composition** | |
| a ($Al_2O_3.TiO_2$) | 0.7000 |
| b ($CaO.Al_2O_3.2SiO_2$) | 0.0400 |
| c ($SrO.Al_2O_3.2SiO_2$) | 0.1850 |
| d ($BaO.Al_2O_3.2SiO_2$) | 0.0000 |
| e ($3Al_2O_3.2SiO_2$) | 0.0750 |
| f ($Al_2O_3$) | 0.0000 |
| g ($SiO_2$) | 0.0000 |
| h ($Fe_2O_3.TiO_2$) | 0.0000 |
| i ($MgO.2TiO_2$) | 0.0000 |

TABLE 4-continued

Composition and batch components for example 19.

| | Example 19 |
|---|---|
| **Inorganic Batch Materials (wt. %)** | |
| $SiO_2$ Silverbond200 ® (Unimin Corp.) | 10.2 |
| $TiO_2$ 3020 ® (Kronos) | 29.7 |
| $Al_2O_3$ A10 ® (Alcan) | 46.7 |
| $Al(OH)_3$ AC714AN | 3.7 |
| Calcium Carbonate, $CaCO_3$ OMYA | 1.4 |
| $SrCO_3$ (Chemical Products) | 8.0 |
| **Inorganic Batch Materials (wt. %)** | |
| Graphite A625 ™ (Ashbury) - pore former | 30 |
| Methocel Hercules Aqualon 334 | 4.5 |
| Emulsion (6.25 wt. % Tall Oil in water with 0.94% of 97 wt. % tri-ethanol amine | ~18% |

TABLE 5

Processing Conditions and Properties for examples 1–5.

| | Examples | | | | |
|---|---|---|---|---|---|
| | 1 | 2 | 3 | 4 | 5 |
| **Processing Conditions** | | | | | |
| Firing temperature (° C.) | 1500 | 1485 | 1400 | 1350 | 1425 |
| Soak time (hours) | 8 | 6 | 8 | 8 | 8 |
| **Properties** | | | | | |
| CTE ($10^{-7}$/° C.) | 5 | 0 | 20 | 46 | 5 |
| Max dL (%) | 0.21 | 0.15 | 0.26 | 0.46 | 0.10 |
| Porosity (%) | 34 | 45 | 38 | 45 | 44 |
| Median pore size ($\mu$m) | 12 | 16 | 21 | 7 | 17 |

TABLE 6

Processing Conditions and Properties for examples 6–10.

| | Example | | | | | |
|---|---|---|---|---|---|---|
| | 6 | 7 | 8 | 9 | 10 | 5 |
| **Processing Conditions** | | | | | | |
| Firing temperature (° C.) | 1485 | 1485 | 1485 | 1455 | 1425 | 1425 |
| Soak time (hours) | 8 | 8 | 8 | 8 | 8 | 8 |
| **Properties** | | | | | | |
| CTE ($10^{-7}$/° C.) | 6 | 9 | 8 | 13 | 6 | 5 |
| Max dL (%) | 0.13 | 0.13 | 0.13 | 0.16 | 0.11 | 0.10 |
| Porosity (%) | 46 | 48 | 48 | 44 | 43 | 44 |
| Median pore size (μm) | 18 | 19 | 19 | 14 | 17 | 17 |

TABLE 7

Processing Conditions and Properties for examples 11–14.

| | Example | | | |
|---|---|---|---|---|
| | 11 | 12 | 13 | 14 |
| **Processing Conditions** | | | | |
| Firing temperature (° C.) | 1485 | 1485 | 1485 | 1485 |
| Soak time (hours) | 6 | 6 | 6 | 6 |
| **Properties** | | | | |
| CTE ($10^{-7}$/° C.) | 2 | 7 | 4 | −1 |
| Max dL (%) | 0.10 | 0.13 | 0.13 | 0.10 |
| Porosity (%) | 46 | 48 | 47 | 45 |
| Median pore size (μm) | 17 | 18 | 18 | 18 |

TABLE 8

Processing Conditions and Properties for examples 15–17.

| | Example | | | |
|---|---|---|---|---|
| | 15 | 16 | 17 | |
| **Processing Conditions** | | | | |
| Firing temperature (° C.) | 1455 | 1455 | 1375 | 1425 |
| Soak time (hours) | 6 | 6 | 6 | 6 |
| **Properties** | | | | |
| CTE ($10^{-7}$/° C.) | −6 | −9 | 2.1 | −4 |
| Max dL (%) | 0.17 | 0.18 | — | 0.16 |
| Porosity (%) | 38 | 26 | 31 | 23 |
| Median pore size (μm) | 15 | 20 | 13 | 17 |

TABLE 9

Processing Conditions and Properties for example 18 as a function of firing temperature.

| | Example 18 | | | |
|---|---|---|---|---|
| **Processing Conditions** | | | | |
| Firing temperature (° C.) | 1375 | 1400 | 1425 | 1455 |
| Soak time (hours) | 6 | 6 | 6 | 6 |

TABLE 9-continued

Processing Conditions and Properties for example 18 as a function of firing temperature.

| | Example 18 | | | |
|---|---|---|---|---|
| **Properties** | | | | |
| CTE ($10^{-7}$/° C.) | 19 | −1 | −3 | −9 |
| Max dL (%) | — | — | — | — |
| Porosity (%) | 40 | 38 | 36 | 33 |
| Median pore size (μm) | 9 | 14 | 16 | 18 |

TABLE 10

Processing Conditions and Properties for example 19.

| | Example 19 |
|---|---|
| **Processing Conditions** | |
| Firing temperature (° C.) | 1475/1450 |
| Soak time (hours) | 1/15 |
| **Properties** | |
| CTE ($10^{-7}$/° C.) | 9 |
| Max dL (%) | 0.13 |
| Porosity (%) | 50 |
| Median pore size (μm) | 13 |
| MOR (psi) | 224 |

What is claimed:

1. A ceramic body having a composition comprising $a(Al_2O_3.TiO_2)+b(CaO.Al_2O_3.2SiO_2)+c(SrO.Al_2O_3.2SiO_2)+d(BaO.Al_2O_3.2SiO_2)+e(3Al_2O_3.2SiO_2)+f(Al_2O_3)+g(SiO_2)+h(Fe_2O_3.TiO_2)+i(MgO.2SiO_2)$, wherein a, b, c, d, e, f, g, h, and i are weight fractions of each component such that $(a+b+c+d+e+f+g+h+i)=1$, wherein $0.5<a\leqq 0.95$; $0\leqq b\leqq 0.5$; $0\leqq c\leqq 0.5$;$0\leqq d\leqq 0.5$; $0<e\leqq 0.5$; $0\leqq f\leqq 0.5$; $0\leqq g\leqq 0.1$; $0\leqq h\leqq 0.3$; $0\leqq i\leqq 0.3$; $b+d>0.01$.

2. The ceramic body of claim 1 wherein a=0.7, b=0.04, c=0.185, e=0.075, d, f, g, h, i=0.

3. A diesel particulate filter comprising an end-plugged, wall-flow honeycomb filter ceramic body composed of a $(Al_2O_3.TiO_2)+b(CaO.Al_2O_3.2SiO_2)+c(SrO.Al_2O_3.2SiO_2)+d(BaO.Al_2O_3.2SiO_2)+e(3Al_2O_3.2SiO_2)+f(Al_2O_3)+g(SiO_2)+h(Fe_2O_3.TiO_2)+i(MgO.2TiO_2)$, wherein a, b, c, d, e, f, g, h, and i are weight fractions of each component such that $(a+b+c+d+e+f+g+h+i)=1$, wherein $0.5<a\leqq 0.95$; $0\leqq b\leqq 0.5$; $0\leqq c\leqq 0.5$; $0\leqq d\leqq 0.5$; $0<e\leqq 0.5$; $0\leqq f\leqq 0.5$; $0\leqq g\leqq 0.1$; $0\leqq h\leqq 0.3$; $0\leqq i\leqq 0.3$; $b+d>0.01$.

4. The diesel particulate filter of claim 3 wherein a=0.7, b=0.04, c=0.185, e=0.075, d, f, g, h, i=0.

5. The diesel particulate filter of claim 4 exhibiting properties comprising: CTE (RT to 1000° C.) of less than $10\times10^{-7}$/° C.; porosity of 40% to 55% by volume; median pore size of 5 to 20 micrometers; and, modulus of rupture as measured by on a cellular bar having a cell density of 200 cpsi and 0.016 inch thick walls, of 150 to 400 psi.

6. The diesel particulate filter of claim 5 wherein the median pore size is 10 to 15 micrometers.

7. The diesel particulate filter of claim 5 wherein the modulus of rupture is 150 to 400 psi.

8. The diesel particulate filter of claim 7 wherein the modulus of rupture is 150 to 300 psi.

9. The diesel particulate filter of claim 5 further exhibiting a pressure drop of 4 kPa or less at an artificial carbon soot loading of up to 5 g/L and a flow rate of 210 standard cubic feet per minute (scfm) for a cell density of 292 cells per square inch (cpsi) and a cell wall thickness of about 0.013 inches.

10. A method of making an aluminum titanate-based ceramic body comprising:

(a) formulating a batch of inorganic raw material components including sources of silica, alumina, strontium, barium, calcium, titania, and/or iron oxide together with organic processing components including plasticizers, lubricants, binders, and water as solvent, (b) mixing the batch of inorganic and organic components to form a homogeneous and plasticized mixture;

(c) shaping the plasticized mixture into a green body;

(d) heating the green body at a temperature and for a time to develop a ceramic composed of a $(Al_2O_3.TiO_2)$+b $(CaO.Al_2O_3.2SiO_2)$+c$(SrO.Al_2O_3.2SiO_2)$+d $(BaO.Al_2O_3.2SiO_2)$+e$(3Al_2O_3.2SiO_2)$+f$(Al_2O_3)$+g $(SiO_2)$+h$(Fe_2O3TiO_2)$+i$(MgO.2TiO_2)$ where a, b, c, d, e, f, g, h, and i are weight fractions of each component such that (a+b+c+d+e+f+g+h+i)=1, wherein $0.5<a\leqq 0.95$; $0\leqq b\leqq 0.5$; $0\leqq c\leqq 0.5$; $0\leqq d\leqq 0.5$; $0<e\leqq 0.5$; $0\leqq f\leqq 0.5$; $0\leqq g\leqq 0.1$; $0\leqq h\leqq 0.3$; $0\leqq i\leqq 0.3$; b+d>0.01.

11. The method of claim 10 wherein the batch further includes a pore former in an amount of 20–40% by weight per 100 parts of inorganic raw material components.

12. The method of claim 10 wherein the shaping is done by extrusion.

13. The method of claim 12 wherein the plasticized mixture is extruded into a honeycomb green body.

14. The method of claim 10 wherein the ceramic body is composed of a$(Al_2O_3.TiO_2)$+b$(CaO.Al_2O_3.2SiO_2)$+c $(SrO.Al_2O_3.2SiO_2)$+d$(BaO.Al_2O_3.2SiO_2)$+e $(3Al_2O_3.2SiO_2)$+f$(Al_2O_3)$+g$(SiO_2)$+h$(Fe_2O_3.TiO_2)$+i $(MgO.2TiO_2)$ where a, b, c, d, e, f, g, h, and i are weight fractions of each component such that (a+b+c+d+e+f+g+h+i)’1, where a=0.7, b=0.04, c=0.185, e=0.075, d, f, g, h, i=0.

* * * * *

UNITED STATES PATENT AND TRADEMARK OFFICE
CERTIFICATE OF CORRECTION

PATENT NO. : 6,942,713 B2 
DATED : September 13, 2005
INVENTOR(S) : Ogunwumi et al.

It is certified that error appears in the above-identified patent and that said Letters Patent is hereby corrected as shown below:

Column 12,
Line 36, "i ($MgO \cdot 2SiO_2$)" should be -- i ($MgO \cdot 2TiO_2$) --.

Column 13,
Line 19, "h ($Fe_2O3TiO_2$)" should be -- h ($Fe_2O_3 \cdot TiO_2$) --.

Column 14,
Line 18, "i)'1" should be -- i) = 1 --.

Signed and Sealed this

Seventeenth Day of January, 2006

JON W. DUDAS
*Director of the United States Patent and Trademark Office*